United States Patent [19]
Liao et al.

[11] Patent Number: 5,590,186
[45] Date of Patent: Dec. 31, 1996

[54] SYSTEM AND METHOD FOR REDIRECTING A TELEPHONE CALL WITH CALL MERGING

[75] Inventors: Frank Y. Liao, Howell; Antoinette Rule, Trenton; Rise J. Frankel, Somerset; Thomas W. Blickle, Keyport, all of N.J.; Sandra L. Bish, Thornton, Colo.

[73] Assignee: AT & T, Holmdel, N.J.

[21] Appl. No.: 172,374

[22] Filed: Dec. 22, 1993

[51] Int. Cl.⁶ .......................... H04M 3/42; H04M 11/04
[52] U.S. Cl. .......................... 379/210; 379/211; 379/201; 379/207; 379/202; 379/112; 379/212; 379/67; 379/88; 379/219; 379/229
[58] Field of Search .................... 379/220, 221, 379/67, 88, 89, 201, 207, 212, 202, 204, 210, 112, 229, 230, 142, 213

[56] References Cited

U.S. PATENT DOCUMENTS

| | | | |
|---|---|---|---|
| 4,723,273 | 2/1988 | Diesel et al. | 379/211 |
| 4,747,124 | 5/1988 | Ladd | 379/212 |
| 4,757,267 | 7/1988 | Riskin | 379/201 |
| 4,788,719 | 11/1988 | Gupta | 379/114 |
| 4,878,239 | 10/1989 | Solomon et al. | 379/211 |
| 4,878,240 | 10/1989 | Lin | 379/67 |
| 4,893,335 | 1/1990 | Fuller | 379/212 |
| 4,908,850 | 3/1990 | Masson | 379/89 |
| 4,987,587 | 1/1991 | Jolissaint | 379/198 |
| 5,023,868 | 6/1991 | Davidson et al. | 379/88 |
| 5,036,535 | 7/1991 | Gechter | 379/210 |
| 5,136,636 | 8/1992 | Wegrzynowicz | 379/207 |
| 5,153,907 | 10/1992 | Pugh | 379/207 |
| 5,199,062 | 3/1993 | Von Meister et al. | 379/216 |
| 5,210,789 | 5/1993 | Jeffus | 379/223 |
| 5,249,221 | 9/1993 | Ketring | 379/214 |
| 5,274,700 | 12/1993 | Gretcher et al. | 379/142 |
| 5,335,266 | 8/1994 | Richardson, Jr. et al. | 379/88 |
| 5,361,295 | 11/1994 | Solomon et al. | 379/202 |
| 5,369,695 | 11/1994 | Chakravarti et al. | 379/220 |
| 5,392,343 | 2/1995 | Davitt et al. | 379/211 |
| 5,432,845 | 7/1995 | Burd et al. | 379/210 |

Primary Examiner—Krista M. Zele
Assistant Examiner—Parag Dharia
Attorney, Agent, or Firm—Barry H. Freedman

[57] ABSTRACT

Calls made to a toll-free 800 service subscriber are routed to a subscriber's primary location via a telephone network switch operating in conjunction with a specially configured adjunct processor. The adjunct processor routes the call from the calling party to the primary location through a first call leg extending between the calling party, switch and adjunct processor. A second call leg is extended from the adjunct processor, through the switch to an alternate destination. The first and second call legs are bridged within the adjunct processor for completing the call from the calling party to the alternate location. After the called is bridged, the two call legs are released to and from the adjunct processor while merging the two legs within the switch so as to conserve adjunct processor resources for further incoming calls. The described system also provides for five different redirection features: 1) blind transfer, 2) soft transfer, and 3) conference—consultation for human agents; and 4) blind and 5) soft transfer for voice response units (VRU's).

39 Claims, 4 Drawing Sheets

SYSTEM AND METHOD FOR REDIRECTING A TELEPHONE CALL WITH CALL MERGING

CROSS REFERENCES TO RELATED APPLICATIONS

This patent application is related to patent application Ser. No. 07/993,754 filed Dec. 21, 1992 is now U.S. Pat. No. 5,432,845 and entitled "Recurrent Call Prompter and Post Answer Call Redirection."

FIELD OF THE INVENTION

This invention relates to a system and method for completing telephone calls by redirecting the telephone call to an alternate location through an adjunct processor associated with a switch to which the calls are redirected.

BACKGROUND OF THE INVENTION

In one proposed call redirection telephone system, calls made to a toll free 800 service number are routed to the subscriber's primary location via a telephone network switch operating in conjunction with a specially configured adjunct processor. The adjunct processor monitors the call and the adjunct is signaled, typically by a dual tone multi-frequency signal (DTMS) sequence if the call is to be redirected from the primary location to an alternate location. The adjunct processor places the calling party on hold and initiates a call to the alternate location on an outgoing trunk to the network switch in such a way that it emulates the routing call treatment and billing characteristics of a call as if it were made from the original calling party location to the alternate location. The subscriber of the originally dialed toll-free 800 number pays only for the portion of the call in which the primary location is active. The subscriber providing the 800 toll free number for the alternate location pays for the portion of the call in which the alternate location is involved as though the call originated from the customers location and proceeded directly to the alternate location without having been rerouted at the network switch. Thus, at the primary location, the subscriber is not charged for any period of time which is not used at the primary location by the subscriber.

Redirection is completed in one of three ways: 1) blind transfer, 2) consultation, or 3) conference. With blind transfer, the primary location disconnects before or while the second call is being established. When the second call has been established, the adjunct processor bridges the original call with the call to the alternate location, thereby completing a path from the customer location to the alternate location which bypasses the primary location.

With consultation, a voice path is established between the primary location and the alternate location, while the calling party remains on hold. The attendant at the primary location can then disconnect at which time the calling party is removed from hold and enabled to converse with the person now at the alternate location. Alternately, the person now at the alternate location can disconnect, enabling the primary location to initiate another call redirection. If the calling party disconnects, the entire call is terminated.

If a conference call is desired, the primary location can request interconnection or bridging of the calling party with both the primary and alternate locations for a three way conference call.

Although the described system provides for call redirection so that a subscriber is not charged for any period of time which is not "used" by that subscriber, the system still preferably uses a human operator at the primary location for signalling the adjunct processor when a redirect signal is required. Additionally, announcements made from the adjunct processor to the primary location are voice announcements. In some industries, the subscribers prefer voice response units. Voice response units are common with subscribers such as airline services and other similar services which require a bank of announcements for interaction with the calling party.

It is also desirable to segment various call redirection capabilities for use with either a human agent or voice response unit on the subscriber premises. For example, some redirecting parties may retry redirection if a dial tone is obtained during redirection, but at the same time, allow quick disconnect of the redirecting party if the connection is made such as in blind transfer. The above system does not provide such segmentation.

Additionally, the above system has high operating cost associated with operating the adjunct processor in monitor mode when a "hairpin" connection is made through the adjunct processor. In this connection the calling party is connected to the primary location through the adjunct processor back to the 4ESS switch and over a second voice path to its destination at the alternate location. The adjunct processor remains in this "monitor mode" in a "hairpinned" state for the duration of the call and ties up adjunct and 4ESS resources.

It is therefore desirable to maintain the call between the calling party and alternate location without using the adjunct processor throughout the duration of the call.

SUMMARY OF THE INVENTION

The foregoing need is met and a technical advance is achieved with the invention by routing calls made by callers that are customers of a telephone network subscriber, (typically a toll-free 800 or other intelligent network service subscriber) to a primary location via a telephone network switch operating in conjunction with a specially configured adjunct processor and then redirecting the call from the primary location to an alternate location through initiating a call to the alternate location on an outgoing trunk of the network switch. The call is routed on a first call leg from the calling party to the primary location through the adjunct processor. A second call is extended through the adjunct processor through a second call leg extending between the adjunct processor and the alternate destination while bridging the first and second calls to and from the adjunct processor in a "hairpin" connection. In accordance with the present invention, the two calls are merged within the switch for conserving adjunct processor resources for further incoming calls. During the duration of the call, the adjunct processor and 4ESS resources are not tied up with the hairpin connection but are now free to handle other calls.

The system of the present invention may be used with toll-free 800 and other service subscribers who have voice response units instead of human agents answering their inbound calls. These units can detect dual tone multifrequency signals (DTMF) tones and play announcements to callers so that the call can be properly handled without human intervention.

In accordance with the present invention, the system is segmented into five different features: 1) blind transfer, 2)

soft transfer, 3) conference-consultation for human agents; and 4) blind transfer and 5) soft transfer for use with subscribers who have voice response units (VRU's) instead human agents answering their inbound calls.

In the blind transfer feature, the redirecting party requests redirection of an answered 800 call by entering a touch tone sequence followed by an 800 number. Once the network has received the touch tone sequence followed by the required destination call of 10 or 11 digits from the redirecting party, the redirecting party will automatically be released from the network. The redirecting party has no assurance of the outcome of the call. With the use of a voice response unit (VRU) as a redirecting party, the voice response unit would be dropped.

In the soft transfer mode, the redirecting party initiates a transfer by entering a touch tone sequence such as a *8 followed by the 800 number of the target party. If the redirected call encounters a busy or other network tones or announcements, the redirecting party is allowed to retry the redirection. If the target party is ringing or has answered, the redirecting party will be automatically released by the network. If a voice response unit is the redirecting party, and the target party answers, the VRU is dropped automatically. If the target party signal is busy, the voice response unit can enter redirection commands (also referred herein as PACR commands) such as a sequence of touch tones so that the VRU stays on line to monitor the outcome of the transfer.

The conference-consultation feature is the third offering under the present system. The redirecting party can initiate a redirection by entering a touch tone sequence such as *8 followed by the 800 number of the target party. Under conference-consultation, however, the redirecting party has full control of the call. The redirecting party may choose to drop-off after it has entered the target party's 800 number. In this case, the caller will connect to the target party as in a blind transfer. The redirecting party may choose to remain on the line and wait for an answer from the target party so it can converse (or consult) with the target party first, either before dropping off, or by bridging the caller in a three-way conference mode.

DESCRIPTION OF THE DRAWINGS

The foregoing and other objects and advantages of the present invention will be appreciated more fully in the following description, with reference to the accompanying drawings in which:

FIG. 4 illustrates the manner in which FIGS. 2 and 3 are combined.

DETAILED DESCRIPTION OF THE INVENTION

Figure 1:
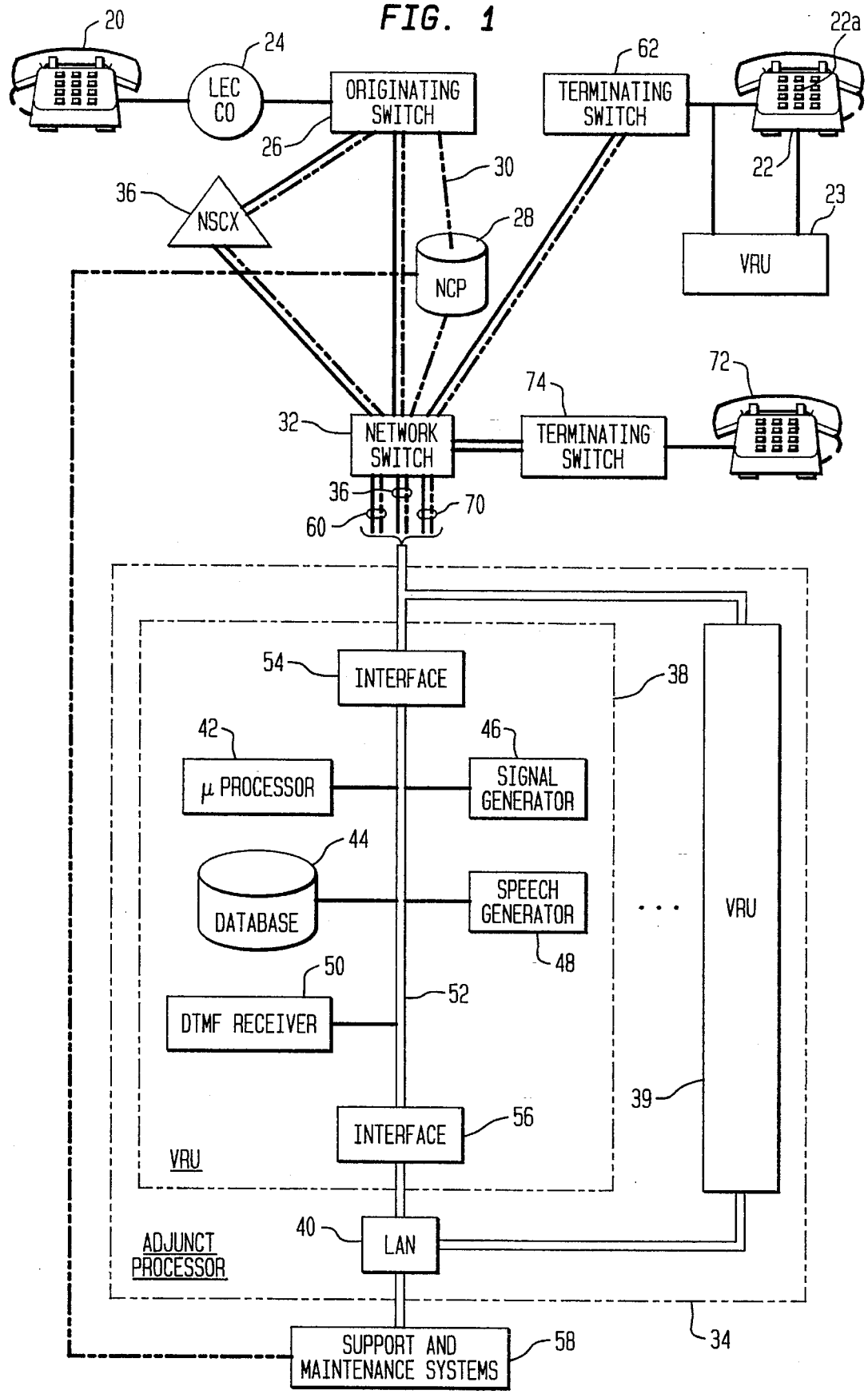
FIG. 1 is a block diagram of a system arranged to route calls originated by a calling party at a customer location through a primary location for monitoring the calls for a signal indicative of a desire to forward the call to the alternate location.

Referring now to FIG. 1, there is illustrated a block diagram of a system in accordance with the present invention which routes a telephone call originated by a calling party at a customer location 20 to a primary location 22 which may have subscriber personnel (human agents) or Voice Response Units (VRU) as a redirecting party. The system in accordance with the present invention monitors the call for redirect signals for routing the call to an alternate location through means of an adjunct processor associated with a network switch. The call legs extending through the adjunct processor are dropped and the call is merged in the associated network switch. In the following description, the subscriber personnel or VRU at the primary location are referred to as the "redirecting party" and the attendant or other personnel at the alternate location are referred to as the "target party."

Figure 2:
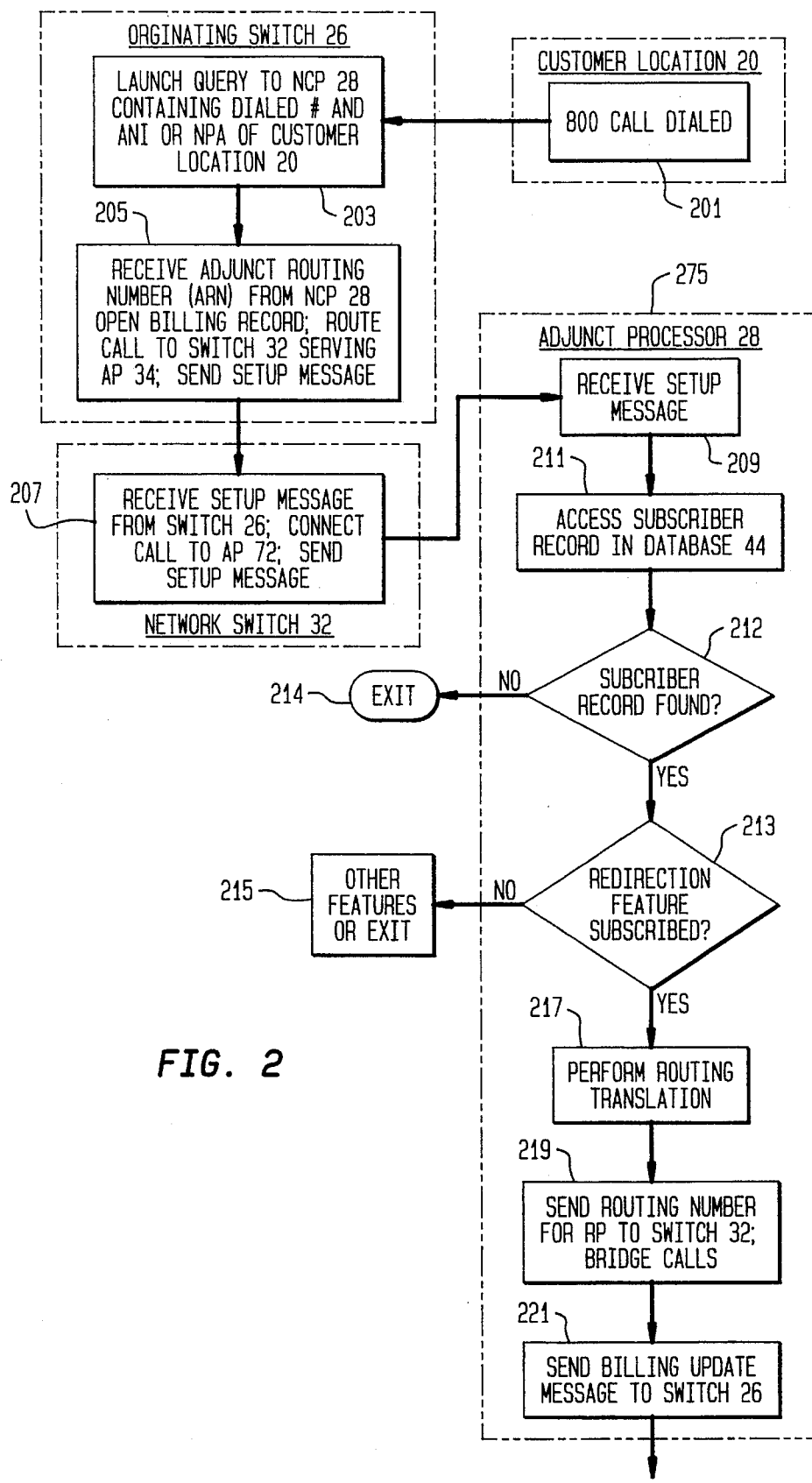
FIGS. 2 and 3 contain a flow diagram describing the process performed when using the system of FIG. 1.
Figure 3:
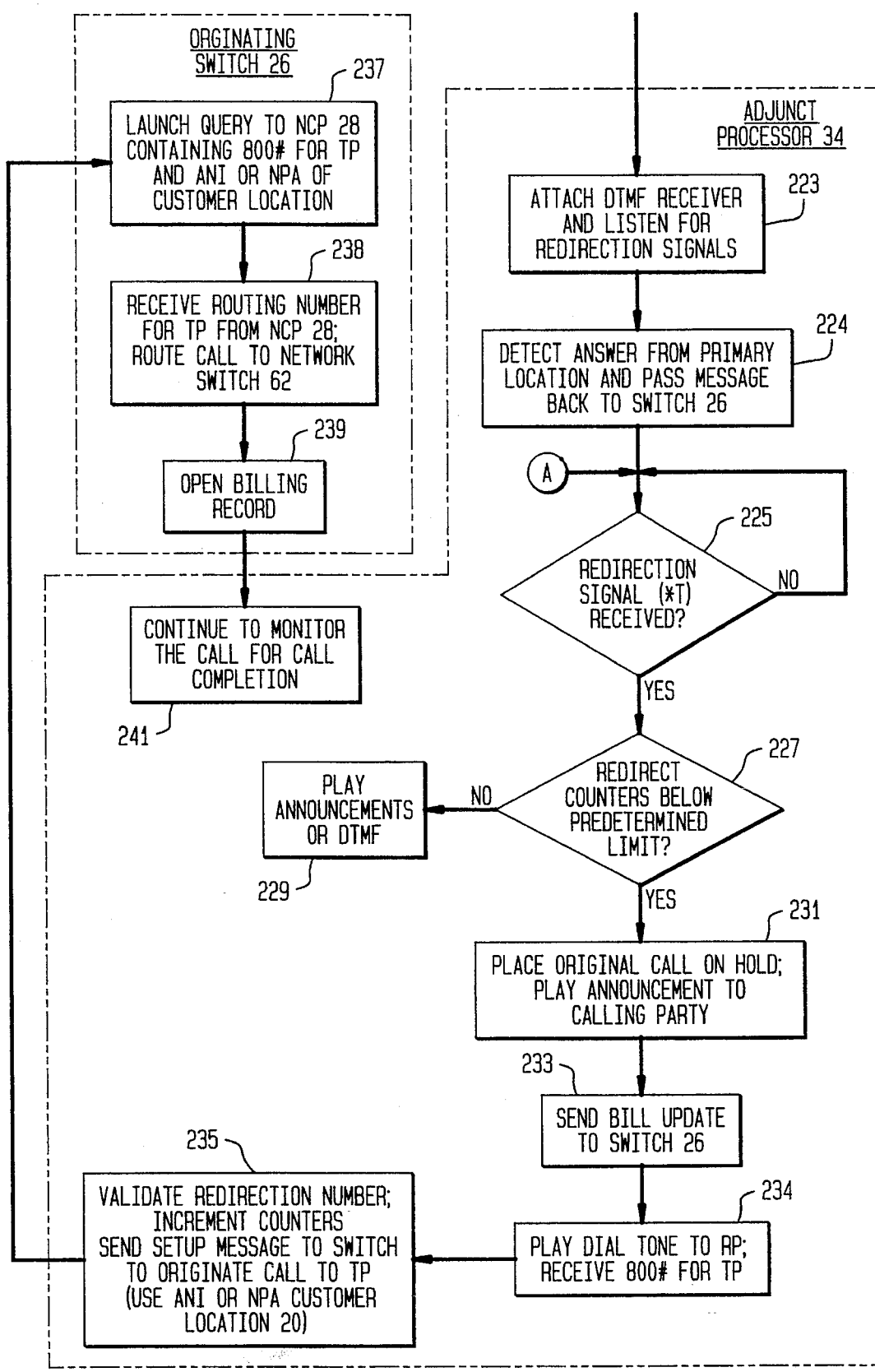
Figure 4:
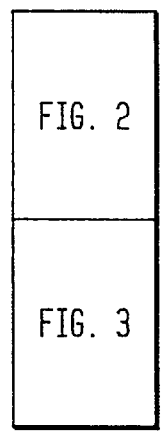

The following description is better understood by reference to FIG. 1, when taken in conjunction with the flow chart of FIGS. 2 and 3 which contain a flow diagram illustrating the basic steps performed in processing a toll free or 800 type call originated from a customer location 20 (The steps in the flow chart will be referred to the numbers beginning in the 200 series.) It is to be understood, however, that the invention can be used in the context of other types of calls. The designations of "customer" and "attendant" that are used in the description are for descriptive purposes only and there is no requirement that any person placing the call from the calling party's location actually purchase any goods or services form a person receiving the call.

In the present invention, the telephone network subscriber has subscribed to one of five services which are described in detail below and referred to as PACR offerings. These offerings depend on whether human agents (subscriber personnel) or voice response units (VRU's) are used at the subscriber premises location. If a human agent is used, the subscriber may choose one of three services: 1) blind transfer, 2) soft transfer, or 3) conference—consultation. If the subscriber uses a voice response unit, the subscriber can choose one of two services 4) blind transfer with VRU, or 5) soft transfer with VRU. In the description which follows, these are referred to as PACR offerings (Post Answer Call Redirection Offerings).

A calling party makes an 800 call at a customer location to a telephone network subscriber by dialing that subscriber's 800 number (Step 201). This call is routed by conventional means of a local exchange switch 24 (such as a 5ESS electronic switching system available from AT&T) to an "originating" switch 26 (such as a 4ESS switching system available from AT&T) that services calls to that 800 number. The switch launches a query (Step 203) to a network control point (NCP) 28, which as those skilled in the art are aware, is a centralized database that is part of the SS7 signaling system. This query includes the dialed number and information identifying the customer location such as the automatic number identification (ANI) for the line servicing that location. The query is transmitted to the NCP 28 via a signalling link The NCP 28 retrieves and then "executes" the subscriber record associated with the dialed number to obtain a routing number used to direct the originating switch as to routing of the call (Step 205). If the NCP database contains a record that the called subscriber is a subscriber of one of the five redirection features as noted above, then the call is marked to forward the call to a network switch 32 having an adjunct processor 34. The routing number provided to the switch is a special routing number designated as an "adjunct routing number" or ARN. The routing number obtained from the NCP can be made sensitive to call origination location. Thus, a customer subscriber, as is conventional, may choose a routing plan where calls made in one region can be routed to a first service center and calls made in another region are routed to a second service center.

Calls to the 800 number may generate an adjunct routing number in the format SSS-TTT-XXXX where 1) SSS is an identifier associated with the network switch 32 connected to adjunct processor 34; 2) TTT is an identifier associated with the record of the redirecting party at the primary location 22; and 3) XXXX represents information about customer locations such as the originating numbering plan area (NPA) and other information entered by the calling party at the customer location such as the dialed number or responses to prompts that may be useful to the subscriber.

The NCP 28 may provide other features when it is queried such as call treatment sensitive to the location of the calling party, time of day and/or day of week, and a "call prompter" service where a calling party can be connected to a network services complex (NSCX) 36 which interacts with the calling party using stored voice scripts so as to play announcements to the calling party and/or collect information from the calling party. This collected information can be used for further processing of the call.

The routing member contains a code that can be interpreted by the switch as having multiple, sequential routing choices. When the switch receives the codes, it retrieves a table containing information defining the first choice of available routing. The table also may contain information defining a second choice routing in the event the first choice is busy, out of service, or otherwise unavailable. Other routing choices also can be available to provide back up capability in the event that a particular network element such as the adjunct processor 34 is temporarily inoperative.

When the originating switch 26 receives the adjunct routing number (ARN) from the NCP 28, it generates a call "set-up" message for the appropriate destination, network switch 32. The "set-up" message typically includes the ARN as well as information identifying the calling party and dialed number. An automatic message accounting (AMA) billing record is opened in the originating switch at this time for purpose of billing the subscriber for the call.

When the network switch receives the call "set-up" message from the originating switch, it forms a "set-up" message destined for the adjunct processor 34. The "set-up" message can be formulated in Q.931 format in accordance with integrated services digital network standards (ISDN). The "set-up" message also can include the ARN and information identifying the customer location and dialed number. The message is supplied to the adjunct processor 34 (Step 207) on an available ISDN trunk such as trunk 36 in FIG. 1.

The adjunct processor 34 may include several automatic voice response units (VRUs) 38, 39 interconnected by a local area network 40. The VRUs 38 can perform numerous call processing and logical functions such as 1) detecting and validating redirection requests, 2) initiating outgoing calls, 3) originating out of band signalling messages such as those required for network billing purposes, 4) bridging calls, 5) creating three-way conferences, 6) maintaining counters and 7) playing generic voice announcements.

Each VRU 38, 39 includes a microprocessor 42 that can operate under software programs stored in a database 44. This database 44 also contains information describing the redirection features to be provided to each subscriber. The VRU 38 also includes signal and speech generators 46, 48 and a dual tone multifrequency signal (DTMF) receiver 50 which detects touch tone sequences that signal the features invoked by the adjunct processor 34. Each of the elements in the VRU are interconnected by a common bus 52. The switch and lan interfaces 54, 56 are provided to interface the VRU 39 with the network switch and to the local area network from which data, maintenance and/or program updates may be received from an external support and maintenance system The adjunct processor 34 receives the "set-up" message (Step 209) and uses the information to retrieve the stored information from the database 44 indicative of the features to be provided to the subscriber whose 800 number was dialed (Step 211). If in step 212 a subscriber record exists in database 44, the process continues with step 213. If no subscriber record can be found an announcement is played by the adjunct processor 34 to the calling party and the process is terminated (Step 214). In lieu of an announcement, the calling party may receive a "re-order tone or fast busy signal." If a subscriber record does exist the record is retrieved and a determination made whether the call redirection feature of the present invention is to be provided (Step 213). In certain cases, the query indicates other features are available. These include recurrent call prompter (RCP) or advanced information service, other modifications may occur in step 215.

The adjunct processor performs a routing translation (Step 217) by which the information received from the network switch 32 and the information retrieved from the database 44 is combined to form a call "set-up" message that identifies the customer location 20, the dialed number, and other information received from the network switch. This call "setup" message is interpreted by the network switch as a request to initiate a call to the redirecting party at the primary location 22. The adjunct processor determines if an outgoing trunk, or "call leg" such as trunk 60 is available. If the trunk 60 is available, the adjunct processor 34 reserves that trunk. The call "set-up" message is then passed back to network switch 32 in step 219 causing that switch to set up a call to the primary location 22 via a terminating switch 62 serving that location. The terminating switch 62 receives a "set-up" message and attempts to complete the call to the primary location.

When the "set-up" message is sent from adjunct processor 34 to the terminating switch, the call is bridged (Step 219) in the adjunct processor 34 from the customer location to a reserved outgoing trunk 60. The adjunct processor 34 also at this time sends billing information to the originating switch 26 (Step 221). The adjunct processor 34 connects the DTMF receiver 50 to the outgoing trunk 60 (Step 223) directed to the primary location to monitor the call for an indication from the redirecting party (whether a human agent or VRU 23) that the call is to be redirected such as by application of one or more touch-tone sequences (such as depressing keypad 22*a* with the sequence "*8").

When the redirecting party enters the call, the adjunct processor 34 detects the answer and forwards an answer message back towards the originating switch and the LEC central office in which the local switch is located (Step 224). The originating switch 26 also begins an elapsed time recording for the call from the calling party to the redirecting party in response to the receipt of an answer supervision for billing purposes.

As compared to the system routing described above, more conventional 800 calls from the customer location 20 to the primary location 22 would route the call from the originating switch 26 directly to the terminating switch 62 serving the primary location after the NCP has been queried. The redirection feature of the present invention extends the call to the additional network switch 32 that has the associated adjunct processor.

For summary purposes, at this time the calling party 24 has been connected to a redirecting party at primary location 22. This call so far has originated in the customer location 20, and includes the originating switch 26, the network switch 32, the adjunct processor 34 and the terminating switch 62. The call was routed to the adjunct processor 34 because the NCP 28 identified the subscriber as having the desired PACR redirection feature when the NCP 28 was queried.

When the redirecting party 22 (either human agent or VRU 23) has identified the need to engage in either blind transfer, soft transfer (VRU and human agent) or establish conference—consultation (human agent) in accordance with the present invention, a touch-tone sequence "*8" is generated by the redirecting party, (such as the human agent depressing keypad 22a) (either human agent or VRU) (Step 225) and detected by the DTMF receiver 50 in the adjunct processor 34. The adjunct processor 34 checks several counters to ensure that a predetermined limit has not been exceeded and that call redirection is permissible (Step 227). If the number of redirection attempts has been exceeded, a verbal announcement (if human agent) or DTMF tone (if VRU) is generated indicating redirection is not permitted (Step 229).

If redirection is permitted, the adjunct processor 34 places the customer's incoming call on hold (Step 231) and plays an announcement to the calling party advising of the "hold" position. The adjunct processor 34 sends an updated bill message to the originating switch 26 (Step 233) to include the cost of redirection if the cost is imposed on the redirecting party. The VRU or human agent then enters a redirection number for the target party at the alternate location via touch tone signals (Step 234).

The adjunct processor 34 validates the redirection number format and generates a "set-up" message (Step 235) to initiate a second call via a trunk line 70, second "call leg", to the alternate location 72. This call "set-up" message is transmitted to the network switch 32 to identify the call with the telephone number of a customer location 20 rather than the number of the primary location 22. The network switch 32 formulates and transmits a query to the NCP that includes a telephone number of the customer location 20 rather than the number of the primary location 22. This query also includes the redirection number (i.e., the number of the target party at the alternate location) supplied by the redirecting party in Step 234.

The NCP can respond to the query originated from the network switch 32 with call treatment that may be determined as a function of the ANI or NPA of the location in which the call originated as well as features such as "call prompter", "courtesy response" and "alternate termination sequence" features.

Because the network switch receives origination information pertaining to the customer location 20 rather than the primary location 22, the redirected call is routed to the target party 72 as if it actually originated from the customer location. The NCP 28 provides a routing number to the switch 32 for the target party 72 in response to the query launched by switch 32 in Step 237. The routing number is used by the switch to complete the redirected call to a terminating switch 74. When the network switch 32 receives the number for the target party it opens the billing record for the redirected call (Step 239) using the information received from the NCP 110. That information may include the telephone number of the customer location 20 rather than a telephone number of the redirecting party at the primary location 22 and the redirection number. At this point the adjunct processor continues to monitor the call so as to "complete" the redirection process (Step 241).

The call completion process can result in five "outcomes" depending on the action of the redirection party 22, the calling party 20 and the target party 72 and whether the redirection party is a human agent or a voice response unit. These five outcomes are illustrated in the chart below:

TABLE 1

| CC-H for Human Agent | ST-H for Human Agent | ST-V for VRU | BT-H for Human Agent | BT-V for VRU |
| --- | --- | --- | --- | --- |
| The acronyms in Table I above are: | | | | |
| CC-H | Conference - Consultation (Human) | | | |
| ST-H | Soft Transfer (Human) | | | |
| ST-V | Soft Transfer (VRU) | | | |
| BT-H | Blind Transfer (Human) | | | |
| BT-V | Blind Transfer (VRU) | | | |

In CC-H, the subscriber personnel located at the subscriber premises (human agent) as the primary redirecting party initiates a two-way conference call between the primary and target parties 22, 72 and adds the calling party 20 as necessary. Depending on the results of the conference, the primary party 22 drops-off while the calling and target parties 20, 72 remain on line.

In BT-H the subscriber with human agents subscribes to this service. The primary-redirecting party 22 determines that this call needs to be redirected. The human agent presses *8 and enters a redirect 800 number. The adjunct processor 34 recognizes this as a blind transfer redirection request because the adjunct record indicates that this is the service subscribed to by the subscriber. Once the adjunct processor 34 has collected the 10 or 11 digits from the redirecting party, the adjunct processor 34 will disconnect the redirecting party. The adjunct processor sets up the call legs to the target party 72.

In BT-V, instead of verbal announcements with a human operator, only DTMF tones are played. The sequence of operation is otherwise the same as in BT-H.

In ST-H, the redirecting party can retain the call longer in the call flow than in the case of blind transfer. In blind transfer, the redirecting human agent or VRU is disconnected after the adjunct processor 34 has collected 10 or 11 digits from the redirecting party 22, and thus cannot attempt redirection. With the soft transfer outcome, the redirecting party 22 will have the opportunity to re-attempt redirection if the adjunct processor 34 does not receive a Q.931 connect from the target party 72 (such as if the target party is busy). If the adjunct processor 34 does receive an answer from the target party 72, the adjunct processor will play an announcement to the redirecting party and then drop the redirecting party.

In ST-H, the process is basically the same as described above, except that the DTMF tones will be played.

The following tables, Tables 2, 3 and 4 show examples of various PACR commands which may be used in accordance with the present invention. These PACR commands are examples, and can vary depending on the system setup envisioned by one skilled in the art.

Table 2 below displays the PACR commands sent by the requesting party to the adjunct processor 34 to access the various PACR functions. The left most column of the table contains touch tone commands. The second column has the commands function and the remaining five columns specify whether the stated feature uses that command or not. If the command is used the letter "C" is inserted in the table. If the command is not available, the letters "NA" are inserted in the table.

TABLE 2

PACR COMMANDS

| Command | Command's function | CC-H | ST-H | BT-H | ST-V | BT-V |
|---|---|---|---|---|---|---|
| # | Terminates 800 number entry | c | c | c | c | c |
| *H (*4) | Put CP on Hold | c | c | na | c | na |
| H (4) | Access Help | c | c | c | na | na |
| *R (*7) | Return CP to RP | c | c | na | c | na |
| *T (*8) | Request for Transfer | c | c | c | c | c |
| X (9) | Drop target party | c | c | na | c | na |

Table 3 below shows the PACR announcements and touch tones sent by the adjunct processor 34 to the live (human agent) and automated (VRU) 800 agents. The left most column of the table contains the announcement numbers while the second column has the announcements used by PACR. The third column specifies whether the announcement is interruptible or not. An announcement is interruptible by either another command entry or by an 800 number entry. While Table 3 is only illustrative of one complete PACR announcement set, various touch tones and other commands may be used as one skilled in the art determines available and necessary for operation and as customer subscribers require.

TABLE 3

PACR Announcements

| Ann Num | Announcement | Interruptible |
|---|---|---|
| pacr-1 | "Please stay on the line. We will be with you shortly." | i |
| pacr-1a | "Please stay on the line. Your caller will be with you shortly." | i |
| pacr-2 | "You call cannot be completed, because you have exceeded a maximum of four redirection attempts. You may want to ask your caller to hang up and dial the 800 number directly." | i |
| pacr-2a | "This call has already been redirected the maximum number of items. You may want to ask your caller to hand up and dial the 800 number directly." | |
| pacr-3b | "You 800 number is incomplete. At the dial tone please re-enter your 800 number." | i |
| pacr-4 | "Your 800 number was not entered within the allowed period. At the dial tone please enter your 800 number." | i |
| pacr-5a | "Your caller has hung up." | not i |
| pacr-5c | "Your caller has hung up. You will be disconnected in 30 seconds." | not i |
| pacr-5d | "Your original caller has hung up. You will be disconnected in 30 seconds." | not i |
| pacr-5e | "We're sorry, but you will now be disconnected." | not i |
| pacr-6 | "We're sorry, your recall was unable to be completed. Please hang up and dial your 800 number again." | i |
| pacr-6a | "We're sorry, your call was unable to be completed. Please ask your caller to hand up and dial the 800 number directly." | i |
| pacr-7 | "Your call cannot be completed without entering an 800 number. To redirect your caller, enter star-8 now, followed by the 800 number. To return to your caller, press star-7." | i |
| pacr-8 | "No additional help is available. Please stand by to return to your caller." | i |
| pacr-9 | "No command has been entered within the allowed period. You are now being returned to your caller." | not i |
| pacr-10 | fast busy signal (signals not outgoing trunks) | i |
| pacr-11 | "At the dial tone, please re-enter your 800 number." | i |
| pacr-12 | "Your call will be transferred." | i |
| pacr-13 | Touch tone pattern 1-p-5-p-9 (signals a PACR call; p = pause; duration = 5 × 70 ms = 350 ms) | not i |
| pacr-14 | Touch tone pattern 5-p-5 (signals CP going off hold; p = pause; duration = 3 × 70 ms = 210 ms) | not i |
| pacr-15 | Touch tone pattern **5 (signals VRU to tell CP to dial 800 num directly then disconnect CP) | not i |
| pacr-16 | Touch tone pattern **6 (signals VRU that transfer will be made) | not i |
| pacr-17 | Touch tone pattern **7 (signals VRU to re-enter the 800 number) | not i |
| pacr-18 | Touch tone pattern **8 (signals VRU to re-enter *T then the 800 number) | not i |
| pacr-E1 | "We're sorry, your call cannot be completed as dialed. At the dial tone please re-enter your 800 number." | i |
| pacr-E2a | "The command that you entered was not recognized. To transfer your call or to set up a conference call, press star-8. To return to your caller press star-7." | i |
| pacr-E2b | "The command flm you entered was not recognized. To transfer your call, or to set up a conference call, press star-8. You are now being returned to your caller." | i |
| pacr-E2c | "The command that you entered was not recognized. To transfer | i |

TABLE 3-continued

PACR Announcements

| Ann Num | Announcement | Interruptible |
|---|---|---|
| | your call press star-8. To return to your caller press star-7." | |
| pacr-E2d | "The command that you entered was not recognized. To transfer your call press star-8. You are now being returned to your caller." | i |
| pacr-E3 | "The command that you entered cannot be performed in the current context. For more help, press star-star-4 now." | i |
| pacr-E3b | "The command that you entered cannot be performed in the current context. | i |
| pacr-H1 | "To transfer a call, or set up a conference call, press star-8. Then dial the 800 number. For more detailed help, press star-star-4 now." | i |
| pacr-H1b | "To transfer a call press star-8. Then dial the 800 number. For more detailed help, press star-star-4 now." | i |
| pacr-H1d | "To transfer call press star-8. Then dial the 800 number." | i |
| pacr-H2 | "To transfer a call, or set up a conference call press star-8. Then dial the 800 number. To return to your caller, press star-7. To drop your dialed party, press star-star-9. Please enter your command now." | i |
| pacr-H3 | "A dialed 800 number should begin with 800. At the dial tone, please enter your 800 number." | i |
| pacr-H4 | "A dialed 800 number should begin with 800. At the dial tone, please re-enter your 800 number." | i |
| pacr-H5 | "To return to your caller after reaching your dialed party, press star-7. To drop your dialed party, pres star-star-9." | i |

Table 4 shows the PACR announcements (column 1 at the left) that are played by corresponding PACR features (columns 4 through 8) under different conditions (column 3). The announcement numbers refer to the corresponding announcements in Table 3. Table 4 also shows the destination party of the announcement (column 2). The logic of the table is centered on column 3—the condition under which the announcement is played.

The meanings of the symbols in the cells under the feature columns in Table 4 are as follows:

a The announcement designated in column 1 is played in that condition. For example, the "a" under the ST-H feature in row pacr-12 means that announcement pacr-12 is played for that feature under that condition.

na The announcement is not available. For example, the "na" that under CC-H means that no announcement is played for that feature under that pacr-12 condition.

16 An announcement number, e.g., 16, means that the numbered announcement instead of the one listed in column 1 is played for that feature under that condition. For example, the number "16" under ST-V in the pacr-12 row means that announcement pacr-16 is played for that feature under that condition instead of pacr-12.

18/17 For some conditions different tones will be played to a VRU depending on what call state the call is in. For example, "18/17" in the pacr-E2a row means that in some call states pacr-18 played while in others pacr-17 is played.

6[cp] The announcement is played to a different party other than the one that is denoted in column 2. For example, "6[cp]" in row pacr-7 under BT-V shows that pacr-6 is played to the CP in this circumstance.

TABLE 4

PACR Announcements: When played & for what feature

| Ann Num | Play To | When Played | CC-H | ST-H | BT-H | ST-V | BT-V |
|---|---|---|---|---|---|---|---|
| pacr-1 | CP | if CP on hold | a | a | a | a | a |
| pacr-1a | TP | if TP on hold | a | na | na | na | na |
| pacr-2 | RP | if Redirection Attempt limit exceeded | a | a | na | 15 | na |
| pacr-2a | RP | If Adj Access Indicator (AAI) limit or legs bridged limit exceeded | a | a | a | 15 | 15 |
| pacr-3b | RP | if inter-digit time-out during 800 num entry | a | a | a | 17 | 17 |
| pacr-4 | RP | if 800 number time-out at start of 800 num entry | a | a | a | 17 | 17 |
| pacr-5a | RP | if CP drops during hold with RP | a | a | na | na | na |
| paer-5c | RP | if CP drops during conference with RP/TP | a | na | na | na | na |
| pacr-5d | TP | if CP drops during conference with RP/TP | a | na | na | na | na |
| pacr-5e | RP,TP | if 30 see extended 5c/5d consultation is up | a | na | na | na | na |
| pacr-6 | CP | if RP drops while CP on hold | a | a | a | a | a |
| pacr-6a | RP | if redirection impossible due to | a | a | a | 15 | 15 |

TABLE 4-continued

PACR Announcements: When played & for what feature

| Ann Num | Play To | When Played | CC-H | ST-H | BT-H | ST-V | BT-V |
|---|---|---|---|---|---|---|---|
| | | insufficient billing into | | | | | |
| pacr-7 | RP | if Retry Count limit exceeded | a | a | 6[cp] | 18 | 6[cp] |
| pacr-8 | RP | if no further help available | a | a | a | na | na |
| pacr-9 | RP | if no cmd entered time-out | a | a | a | 18 | 18 |
| pacr-10 | RP | if no outgoing trunks from ssa to TP | a | a | a[cp] | 18 | a[cp] |
| pacr-11 | RP | if # entered before DN entry complete | a | a | a | 17 | 17 |
| pacr-12 | RP | if transfer launched after DN entry complete | na | a | na | 16 | 16 |
| pacr-13 | RP | if incoming PACR call | a | a | a | a | a |
| pacr-14 | RP | if CP going off of hold | a | a | a | na | na |
| pacr-E1 | RP | if incorrect 800 num format entered | a | a | a | 17 | 17 |
| pacr-E2a | RP | if invalid *-cmd entered (leave CP on hold) | a | E2c | E2d | 18/17 | 18/17 |
| pacr-E2b | RP | if invalid *-cmd entered (remove CP from hold) | a | E2d | E2d | 18/17 | 18/17 |
| pacr-E3 | RP | if valid *-cmd entered in wrong context (more detailed help available) | a | a | a | 18/17 | na |
| pacr-E3b | RP | if valid *-cmd entered in wrong context (more detailed help not available | a | a | a | 18/17 | 18/17 |
| pacr-H1 | RP | if help requested before *8 entered | a | H1b | H1d | na | na |
| pacr-H2 | RP | if further help requested after H1 | a | H2b | H1d | na | na |
| pacr-H3 | RP | if help requested after *8 but before 800 num entry | a | a | a | na | na |
| pacr-H4 | RP | if help requested during 800 num entry | a | a | a | na | na |
| pacr-H5 | RP | if help requested after 800 num entry | a | a | na | na | na |

Figure 5:
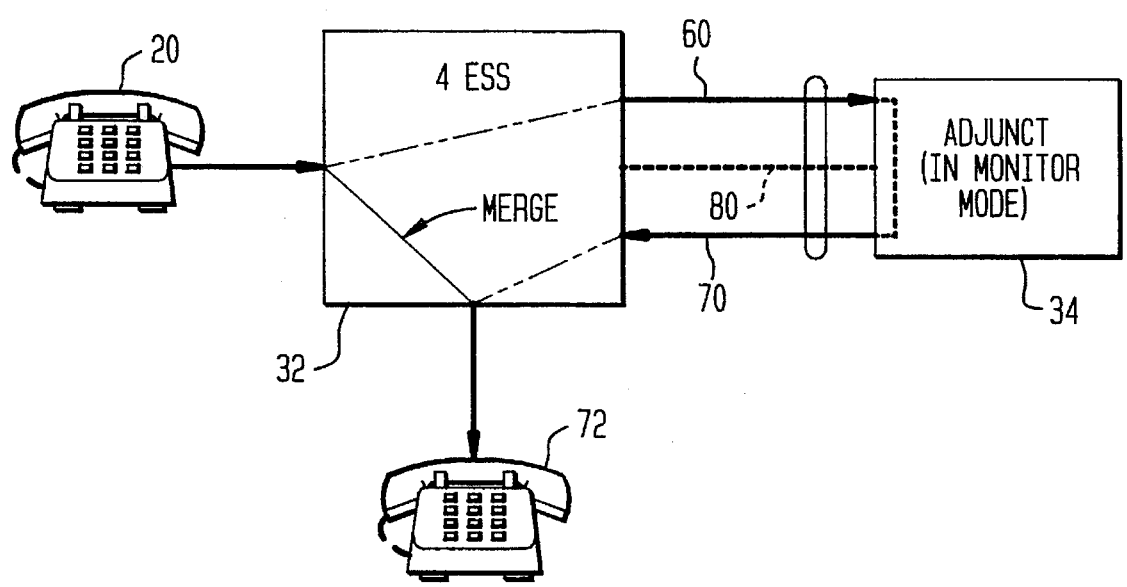
FIG. 5 is a block diagram illustrating call merging within the switch.

FIG. 5 illustrates the call merge function in accordance with the present invention. The call merge function reduces the high cost commonly associated with operating an adjunct processor in the monitor mode where the first call leg 60 is routed from a 4ESS switch to an adjunct processor, thus making a "hairpin" connection through the adjunct processor which connects the call back to the 4ESS switch over a second voice path or call leg 70. The adjunct processor 34 is connected to the call path to perform such functions as playing announcements and collecting digits by either the originating or terminating party.

A call in this mode remains in this "hairpinned" state for the duration of the call and ties up the adjunct processor 34, 4ESS resources, and the interconnecting trunks. In response to a valid request from the adjunct processor 34 (signified by the dashed line 80), the 4ESS will perform a call merge. The two call legs to and from the adjunct processor 34 will be merged into one call in the 4ESS. The two connections to the adjunct processor 34 are then dropped. This releases the adjunct processor and reduces the number of 4ESS and adjunct processor terminations used. The two calls that are to be merged, i.e. those hairpinned to the adjunct processor, do not appear related. The adjunct processor then sends an appropriate message to the 4ESS switch requesting that the trunks merge. Naturally, the call merge must relate to calls that are compatible with each other. The call state must be the same, e.g. both have been answered.

Once the 4ESS switch performs the call merge operation, the switch responds to the adjunct processor with a disconnect message indicating acceptance of the request and clears both legs to and from the adjunct processor 34. Typically, the adjunct processor 34 will request call merge capabilities within 100 milliseconds after both legs of the calls are in acceptable call merge states. To prevent blocking of new calls in the adjunct processor 34, the outgoing trunk 60 should be released before the incoming trunk 70.

It is to be understood that the above description is only one preferred embodiment of the invention. Numerous other arrangements may be devised by one skilled in the art without departing from the spirit and scope of the invention.

That which is claimed is:

1. A system for completing telephone calls comprising means including a switch having an associated adjunct processor for routing a first call from a calling party at a customer location to a redirecting party at a primary location, means in said adjunct processor for monitoring the call after it has been completed to said primary location for a redirection signal indicative to forward said call to an alternate destination, means in said adjunct processor for routing said first call from said calling party to said primary location through a first call leg extending between said switch and adjunct processor and means for routing a second call from said adjunct processor through a second call leg extending between said adjunct processor, switch and said alternate destination, said adjunct processor including means for bridging said first and second call legs for completing the first call from said calling parting to said alternate location, and means for releasing said call legs to and from said adjunct processor while merging said call legs within said switch so as to conserve adjunct processor resources for further incoming calls.

2. The system according to claim 1 wherein said redirecting party is an automatic voice response unit capable of receiving dual tone multifrequency (DTMF) instruction signals, said adjunct processor including means for transmitting to said automatic voice response unit dual tone multifrequency signals indicative of the outcome of the releasing and merging of the call legs.

3. The system according to claim 1 wherein said redirection signal is a touch tone sequence generated in said primary location.

4. The system according to claim 1 including means for conferencing said calling party, said redirecting primary party and said alternate party before said adjunct legs are released.

5. The system according to claim 1 including means at said primary location for entering a redirect number to said alternate location, and said adjunct processor includes means for disconnecting said primary location after said primary location has entered said redirect number and before said call between said calling party and said alternate party has been bridged.

6. The system according to claim 1 including means at said primary location for entering a redirect number to said alternate location, and said adjunct processor includes means for disconnecting said primary location only after said alternate location is successfully bridged.

7. The system according to claim 1 wherein said alternate location comprises a network services complex (NSCX) having an announcement base of stored announcements.

8. The system according to claim 7 wherein said primary location includes means for entering a specific sequence of dual tone multifrequency signals for redirecting said call to said network services complex.

9. The system according to claim 1 including a network control point having database subscriber records to obtain a routing number for the call and determining if said subscriber records indicate that said subscriber's call can be transferred from said primary location to said alternate destination.

10. The system according to claim 1 including means for updating a bill record generated for said first call to indicate redirection of said call to said alternate location.

11. A system for completing telephone calls comprising means including a switch having an associated adjunct processor for routing a call from a calling party at a customer location to a redirecting party at a primary location, a voice response unit (VRU) positioned at said primary location and including means for receiving and processing dual tone multifrequency (DTMF) instruction signals, means in said adjunct processor for monitoring the call after it has been completed to said primary location for a redirection signal indicative to forward said call to an alternate destination, means in said adjunct processor for routing said call from said calling party to said primary location, and including means in said adjunct processor for transmitting to said voice response unit a series of dual tone multifrequency signals indicating the results of the attempted transfer to an alternate destination, so as to enable further, predetermined processing of said call such as transfer to a second alternate location, and including means for releasing said call legs to and from said adjunct processor while merging said call legs within said switch so as to conserve adjunct processor resources for further incoming calls.

12. The system according to claim 11 wherein said adjunct processor includes means for routing said call from said calling party to said primary location through a first call leg between said switch and adjunct processor, and means for extending a second call from said adjunct processor through a second call leg extending between said adjunct processor, switch and said alternate destination, and including means for bridging said first and second call legs for completing said call from said calling party to said alternate location.

13. The system according to claim 11 wherein said redirection signal is a touch tone sequence generated in said primary location.

14. The system according to claim 11 including means for conferencing said calling party, said redirecting primary party and said alternate party before said adjunct processor legs are released.

15. The system according to claim 11 including means at said primary location for entering a redirect number to said alternate location, and said adjunct processor includes means for disconnecting said primary location after said primary location has entered said redirect number and before said call between said calling party and said alternate party has been bridged.

16. The system according to claim 11 including means at said primary location for entering a redirect number to said alternate location, and said adjunct processor includes means for disconnecting said primary location only after said alternate location is successfully bridged.

17. The system according to claim 11 wherein said alternate location comprises a network services complex (NSCX) having an announcement base of stored announcements.

18. The system according to claim 17 wherein said primary location includes means for entering a sequence of dual tone multifrequency signals for redirecting said call to said network services complex.

19. The system according to claim 18 including a network control point having database subscriber records to obtain a routing number for the call and determine if said subscriber records indicate that said subscriber's call can be transferred from said primary location to said alternate destination.

20. The system according to claim 11 including means for updating a bill record generated for said first call to indicate redirection of said call to said alternate location.

21. A method for completing telephone call comprising the steps of routing a call from a calling party at a customer location through a telephone switch having an adjunct processor to a redirecting party at a primary location, monitoring the call for a redirection signal indicative to forward the call to an alternate destination, routing the call from a first call leg from the calling party to the primary location through the adjunct processor and extending a second call leg from the adjunct processor through the switch to an alternate destination while bridging the first and second call legs while merging the legs within the switch for conserving adjunct processor resources for further incoming calls; including the step of transmitting to an automatic voice response unit at the primary location dual tone multifrequency (DTMF) signals indicative of the outcome of the transfer; and further including the step of generating a touch tone sequence in the adjunct processor corresponding to the redirection signal.

22. The method according to claim 21 including the step of conferencing the calling party, the redirecting primary party and the alternate party before the adjunct legs are released.

23. The method according to claim 21 including the step of entering a redirect number to the alternate location, and disconnecting the primary location after the primary location has entered the redirect number and before the call between the calling party and the alternate party has been completely bridged.

24. The method according to claim 21 including the step of entering a redirect number to the alternate location, and disconnecting the primary location after the call to the alternate location is successfully bridged.

25. The method according to claim 21 including the step of redirecting the call to a network services complex (NSCX) having an announcement frame of stored announcements.

26. The method according to claim 25 including the step of entering a specific sequence of dual tone multifrequency signals for redirecting the call to the network services complex.

27. The method according to claim 21 including the step of obtaining a routing number from a database of subscriber records associated with a network control point and including the further step of determining if the subscriber record indicates that the call can be transferred from the primary location to the alternate location.

28. The method according to claim 21 including the step of updating a bill record generated for the first call to indicate redirection of the call to the alternate location.

29. A method for completing telephone calls comprising routing a call from a calling party at a customer location through a telephone switch having an adjunct processor to a voice response unit at a primary location, monitoring the call after it has been completed to the voice response unit at the primary location for a redirect signal indicative to forward the call to an alternate destination, routing the call through first call leg from the calling party through the adjunct processor to the primary location, and transmitting to the voice response unit from the adjunct processor a series of dual tone multifrequency signals (DTMF) indicating the results of the attempted transfer to an alternate destination so as to enable further, predetermined processing of the call such as transferring the call to a second, alternate destination, and including the step of routing the call from the calling party to the primary location through a first call leg extending between a switch and adjunct processor and extending the call from the adjunct processor through a second call leg extending between the adjunct processor the switch and the alternate destination, and bridging the first and second call legs for completing the call from the calling party to the alternate location, and including means for releasing said call legs to and from the adjunct processor while merging said call legs within said switch so as to conserve adjunct processor resources for further incoming calls.

30. The method according to claim 29 including releasing the call legs to and from the adjunct processor while merging the two calls within the switch so as to conserve adjunct processor resources for further incoming calls, and wherein the outgoing all leg from the adjunct processor is released before the incoming call leg.

31. The method according to claim 30 including transmitting to an automatic voice response unit at the primary location dual tone multi frequency (DMTF) signals indicative of the outcome of the transfer.

32. The method according to claim 29 including the step of generating a touch tone sequence in the adjunct processor corresponding to the redirection signal.

33. The method according to claim 29 including the step of conferencing the calling party, the redirecting primary party and the alternate party before the adjunct processor legs are released.

34. The method according to claim 29 including the step of entering a redirect number to the alternate location, and disconnecting the primary location after the primary location has entered the redirect number and before the call between the calling party and the alternate party has been completely bridged.

35. The method according to claim 29 including the step of entering a redirect number to the alternate location, and disconnecting the primary location after the primary location only after the alternate location is successfully bridged.

36. The method according to claim 29 including the step of redirecting the call to a network services complex (NSCX) having an announcement frame of stored announcements.

37. The method according to claim 36 including the step of entering a specific sequence of dual tone multifrequency signals for redirecting the call to the network services complex.

38. The method according to claim 29 including the step of obtaining a routing number from a database of subscriber records associated with a network control point and including the further step of determining if the subscriber record indicates that the call can be transferred from the primary location to the alternate location.

39. The method according to claim 29 including the step of updating a bill record generated for the first call to indicate redirection of the call to the alternate location.

* * * * *